(12) United States Patent
Minoura

(10) Patent No.: US 12,279,188 B2
(45) Date of Patent: Apr. 15, 2025

(54) INFORMATION PROCESSING DEVICE AND INFORMATION PROCESSING METHOD

(71) Applicant: TOSHIBA TEC KABUSHIKI KAISHA, Tokyo (JP)

(72) Inventor: Yusuke Minoura, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 528 days.

(21) Appl. No.: 17/579,948

(22) Filed: Jan. 20, 2022

(65) Prior Publication Data

US 2022/0377511 A1 Nov. 24, 2022

(30) Foreign Application Priority Data

May 24, 2021 (JP) ................................ 2021-087036

(51) Int. Cl.
| | |
|---|---|
| H04W 4/00 | (2018.01) |
| G06Q 30/0601 | (2023.01) |
| H04W 4/029 | (2018.01) |
| H04W 4/33 | (2018.01) |

(52) U.S. Cl.
CPC .......... *H04W 4/33* (2018.02); *G06Q 30/0639* (2013.01); *G06Q 30/0641* (2013.01); *H04W 4/029* (2018.02)

(58) Field of Classification Search
CPC .... H04W 4/33; H04W 4/029; G06Q 30/0639; G06Q 30/0641
See application file for complete search history.

(56) References Cited

U.S. PATENT DOCUMENTS

| | | | | |
|---|---|---|---|---|
| 11,216,865 | B2* | 1/2022 | Parisis | H04W 4/029 |
| 11,978,068 | B2* | 5/2024 | Igarashi | G06Q 30/02 |
| 2014/0181989 | A1* | 6/2014 | Sako | H04W 4/029 |
| | | | | 726/26 |
| 2015/0363798 | A1* | 12/2015 | Aihara | G06Q 30/0201 |
| | | | | 705/7.29 |
| 2016/0203508 | A1* | 7/2016 | Sambe | G06Q 30/0267 |
| | | | | 705/14.41 |
| 2021/0366586 | A1* | 11/2021 | Ryan | G06Q 20/3224 |

FOREIGN PATENT DOCUMENTS

| | | | | |
|---|---|---|---|---|
| JP | 2004312444 A | * | 11/2004 | |
| JP | 2020161194 A | * | 10/2020 | G06K 9/00268 |
| JP | 2021125160 A | * | 8/2021 | |

* cited by examiner

*Primary Examiner* — Khai M Nguyen
(74) *Attorney, Agent, or Firm* — FOLEY & LARDNER LLP

(57) ABSTRACT

An information processing device comprising a processor configured to determine a first timing designated for a product registered as a purchased product. The processor is also configured to determine a first registration position where the product is designated. The processor is also configured to determine a second timing designated for the product. The processor is also configured to determine a second registration position where the product is designated. The processor is also configured to determine, based on the first timing, the first registration position, the second timing, and the second registration position, a first reliability of the first registration position. The processor is also configured to generate first tracking data relating to the product by associating the second timing, the second registration position, and the first reliability.

20 Claims, 4 Drawing Sheets

INFORMATION PROCESSING DEVICE AND INFORMATION PROCESSING METHOD

CROSS-REFERENCE TO RELATED APPLICATION

This application is based upon and claims the benefit of priority from Japanese Patent Application No. 2021-087036, filed on May 24, 2021, the entire contents of which are incorporated herein by reference.

FIELD

Embodiments described herein relate generally to an information processing device and an information processing method.

BACKGROUND

Various techniques for tracking the movement of customers in a shop have been proposed. However, in order to realize this type of technology, it is necessary to construct a large-scale system by arranging a large number of sensors. As the system configuration is simplified, the error of the tracking result increases, and there is a concern that the usefulness of the tracking results is deteriorated.

According to such a situation, there is a demand for a device that can be easily realized and can minimize a decrease in the usefulness of the tracking result to a small extent.

DETAILED DESCRIPTION

An object to be solved by an embodiment is to provide an information processing device and an information processing method that can be easily realized and can minimize a decrease in usefulness of tracking results to a small extent.

In general, according to one embodiment, an information processing device includes a timing determining means, a position determining means, a reliability determining means, and a generating means. The timing determining means determines a timing designated by a customer for a product registered as a purchased product. The position determining means determines a display position of the product designated to be registered as the purchased product as a registration position where the product is designated. The reliability determining means determines, based on the timing (second timing) and the registration position (second registration position) determined by the timing determining means and the position determining means for the product designated to be registered as the purchased product, and the timing (first timing) and the registration position (first registration position) determined by the timing determining means and the position determining means for the product designated to be registered as the purchased product immediately previously, a reliability of the registration position determined by the position determining means for the product designated to be registered as the purchased product immediately previously. The generation means generates tracking data relating to a plurality of products designated by the customer by associating the timing, the registration position, and the reliability determined by the timing determining means, the position determining means, and the reliability determining means with respect to each product. Hereinafter, an embodiment of a product sales processing system configured by using a shop server having a function as an information processing device will be described with reference to the drawings.

Figure 1:
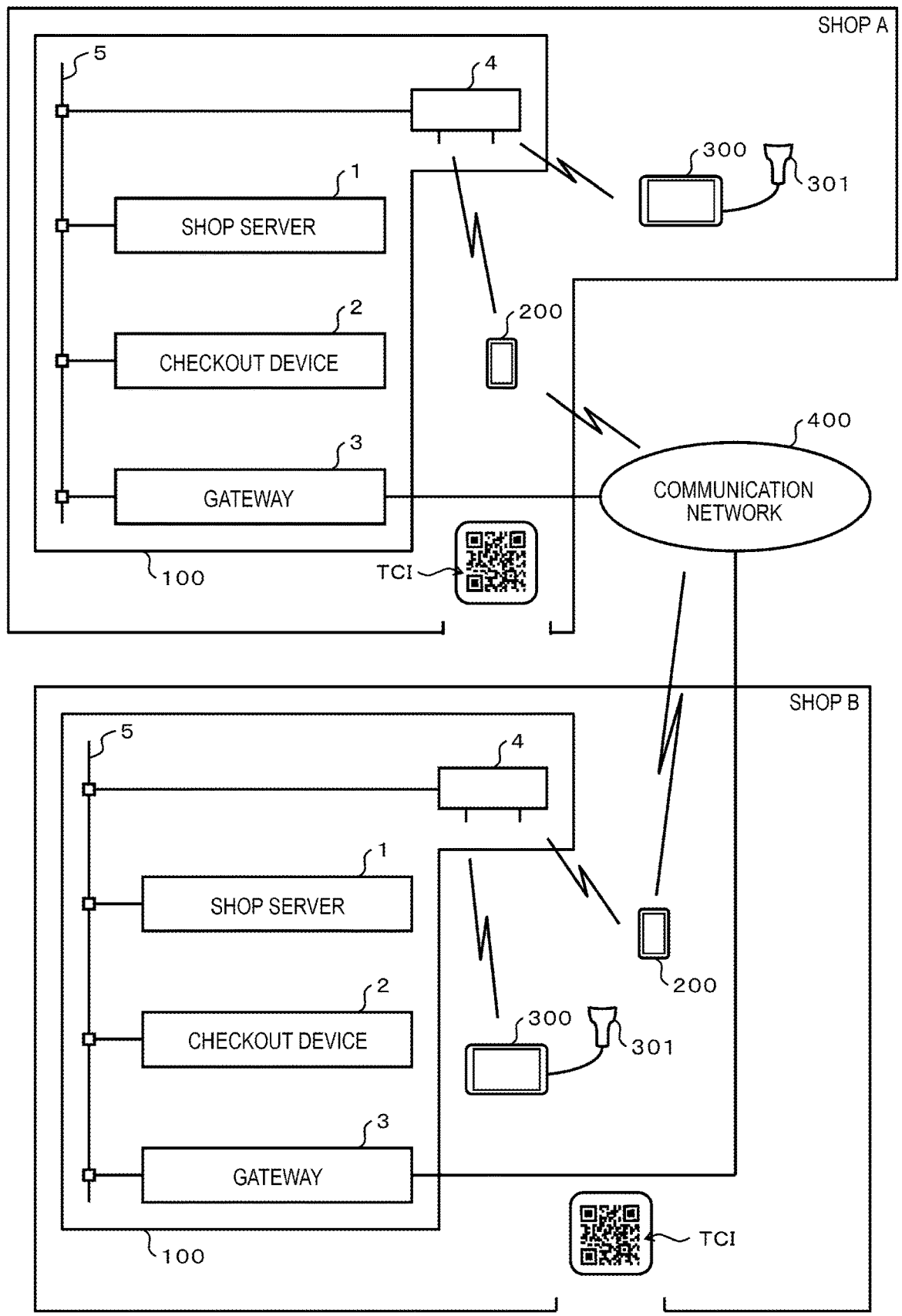
FIG. 1 is a block diagram illustrating a schematic configuration of a product sales processing system according to an embodiment.

FIG. 1 is a block diagram illustrating a schematic configuration of a product sales processing system according to the present embodiment.

The product sales processing system includes a plurality of shop systems 100, user terminals 200, and cart terminals 300. The plurality of shop systems 100 and user terminals 200 are capable of communicating with each other via a communication network 400.

FIG. 1 illustrates two shop systems 100. These shop systems 100 are provided in shops A and B, respectively, which use the product sales processing system and are different shops from each other. There may be only one shop or three or more shops that use the product sales processing system. If there are three or more shops, the shop system 100 is provided for each of those shops.

A business operator that operates the shop A may be the same as or different from a business operator that operates the shop B. If a transaction system is used in another shop, the business operator that operates the shop may be the same as or different from the business operator that operates the shop A or the shop B.

The user terminal 200 and the cart terminal 300 are information processing devices that serve as user interfaces for the customers who are shopping at the shop using the product sales processing system. Although FIG. 1 illustrates one user terminal 200 and one cart terminal 300 in each of the shop A and the shop B, there may be a plurality of user terminals 200 and cart terminals 300 in each shop. Further, in all shops or in some shops, either one of the user terminal 200 and the cart terminal 300 may not be used. The user terminal 200 and the cart terminal 300 have a function of wirelessly communicating with the shop system 100. The user terminal 200 has a function of wirelessly communicating with the communication network 400. The cart terminal 300 may also have a function of wirelessly communicating with the communication network 400. For the user terminal 200, a communication terminal having a data communication function such as a smartphone, a tablet computer, or the like can be used. The user terminal 200 may be the customer's own terminal or may be lent to the customer at the shop. For the cart terminal 300, a communication terminal having a data communication function such as a tablet computer and the like is used, and is attached to a shopping cart provided in the shop A or the shop B. The user terminal 200 and the cart terminal 300 are mainly operated by customers. However, the user terminal 200 and the cart terminal 300 may be operated by a clerk or the like on behalf of the customer. The cart terminal 300 includes a barcode scanner 301. The barcode scanner 301 is a reading device suitably configured to optically read a bar code representing a product code as an identifier for identifying a product by using an infrared laser or the like. For the barcode scanner 301, a reading device configured to recognize and read a barcode from an image captured by an imaging device may be provided in place of, or in addition to the reading device described above.

For the communication network 400, for example, the Internet, a virtual private network (VPN), a local area network (LAN), a public communication network, a mobile communication network, and the like may be used alone or in combination as appropriate. For the communication network 400, a mobile communication network and the Internet are typically used. That is, the communication network 400 is typically a wide area network.

Each of the shop systems 100 has a general configuration in common. That is, the shop system 100 is configured such that a shop server 1, a checkout device 2, a gateway 3, and an access point 4 can communicate with each other via an in-shop communication network 5. However, as long as the shop server 1, the checkout device 2, the gateway 3, the access point 4, and the in-shop communication network 5 have the common functions for realizing the operations described below, they do not have to be exactly the same. In addition, some shop systems 100 may include devices not illustrated in FIG. 1.

The shop server 1 executes information processing for product sales processing such as registration of a purchased product, payment of the price thereof, and the like, in response to requests from the user terminal 200 and the cart terminal 300. Further, the shop server 1 executes information processing for tracking the movement of the customer in the shop.

The checkout device 2 is a user interface device used if the customer makes a payment at the shop. The payment methods that the checkout device 2 can use for the payment may be all or any of well-known payment methods such as cash payment, credit card payment, electronic money payment, point payment, code payment, and the like. In addition, the code payment is also referred to as a mobile payment or a smartphone payment. The checkout device 2 may be operated by either the clerk or the customer. The checkout device 2 can be configured based on a self-service-type checkout device used in an existing semi-self-service-type point-of-sale (POS) system, for example. The checkout device 2 may have a function of performing information processing for registering a product as a purchased product. In this case, the checkout device 2 can be configured based on a face-to-face POS terminal used in an existing POS system or a self-service-type POS terminal used in an existing self-service-type POS system, for example.

The gateway 3 interconnects the in-shop communication network 5 and the communication network 400, and enables communication via both the in-shop communication network 5 and the communication network 400. For the gateway 3, for example, an existing communication device that interfaces the LAN and the Internet can be used.

The access point 4 performs communication processing for enabling the user terminal 200 to access the in-shop communication network 5 by wireless communication. For the access point 4, for example, a well-known communication device that performs wireless communication according to the IEEE802.11 standard can be used. The access point 4 is installed in the shop such that the user terminal 200 can perform wireless communication from anywhere on the sales floor of the shop. According to the shop scale, a plurality of access points 4 may be arranged in one shop system 100.

For the in-shop communication network 5, the Internet, a VPN, a LAN, a public communication network, a mobile communication network, and the like may be used alone or in combination as appropriate. However, typically, the in-shop communication network 5 is a LAN. That is, the in-shop communication network 5 is typically a narrow area network.

A two-dimensional code TCI for check-in is posted in the vicinity of the entrance of the shop provided with the shop system 100. The two-dimensional code TCI represents check-in data for check-in. The check-in data varies from shop to shop.

For example, the check-in data represents, for each shop, (1) an operating version of the shop system 100, (2) a shop code for identifying the shop, (3) a name of a business operator that operates the shop, (4) a name of the shop where the shop system 100 is installed, (5) a business operator code for identifying the business operator that operates the shop, and (6) information required for a connection destination and connection for the user terminal 200 to communicate with the shop system 100. In addition, examples of the connection destination for the user terminal 200 to communicate with the shop system 100 include the access point 4. Examples of the information required for the connection include a service set identifier (SSID) for identifying the access point 4, a password for accessing the access point 4, and the like. Further, examples of the information required for connection include a domain name of the shop server 1.

In addition, the check-in data may not include some of the various information exemplified above. Further, the check-in data may represent information different from the various information exemplified above.

Figure 2:
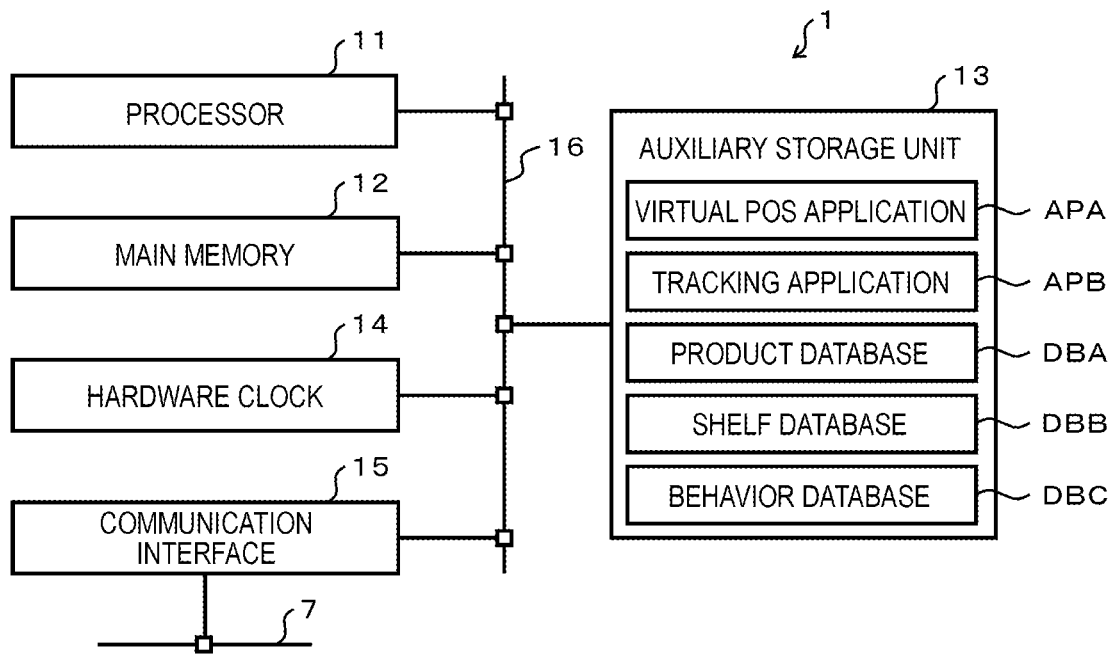
FIG. 2 is a block diagram illustrating a circuit configuration of a main part of a shop server illustrated in FIG. 1.

FIG. 2 is a block diagram illustrating a circuit configuration of a main part of the shop server 1.

The shop server 1 includes a processor 11, a main memory 12, an auxiliary storage unit 13, a hardware clock 14, a communication interface 15, and a transmission line 16. The processor 11, the main memory 12, the auxiliary storage unit 13, the hardware clock 14, and the communication interface 15 are capable of communicating with each other via the transmission line 16. Then, a computer for controlling the shop server 1 is configured by connecting the processor 11, the main memory 12, and the auxiliary storage unit 13 by the transmission line 16. The processor 11 corresponds to the central part of the computer. The processor 11 executes information processing for realizing various functions of the shop server 1 according to an information processing program such as an operating system, an application program, and the like. The processor 11 is a central processing unit (CPU), for example.

The main memory 12 corresponds to a main memory portion of the computer. The main memory 12 includes a non-volatile memory area and a volatile memory area. The main memory 12 stores the information processing program described above in the non-volatile memory area. The main memory 12 may store data necessary for the processor 11 to execute information processing in a non-volatile or volatile memory area. The main memory 12 uses the volatile memory area as a work area in which data is appropriately rewritten by the processor 11. The non-volatile memory area is a read only memory (ROM), for example. The volatile memory area is a random access memory (RAM), for example. The auxiliary storage unit 13 corresponds to an auxiliary storage portion of the computer. The auxiliary storage unit 13 may include a storage unit using a well-known storage device such as electric erasable programmable read-only memory (EEPROM), a hard disk drive (HDD), a solid state drive (SSD), and the like. The auxiliary storage unit 13 stores data used by the processor 11 to perform various processing, data created by the processing of the processor 11, and the like. The auxiliary storage unit 13 may store the information processing program described above. The hardware clock 14 constantly tracks time and outputs time information. The time information may indicate only the hour and minute, or may indicate at least one of year, month, day, and second in addition to the date and time. The hardware clock 14 may be replaced by a system clock managed by the operating system.

The communication interface 15 performs data communication with each unit connected to the in-shop communication network 5 in accordance with a predetermined communication protocol. For the communication interface 15, for example, a well-known communication device for LAN may be applied.

The transmission line 16 includes an address bus, a data bus, a control signal line, and the like, and transmits data and control signals transmitted and received between the connected units.

The auxiliary storage unit 13 stores a virtual POS application APA and a tracking application APB, which are the information processing programs, respectively. The virtual POS application APA is an application program and describes information processing for realizing product sales processing. The tracking application APB is an application program and describes information processing for tracking the movement of a customer.

Figure 3:
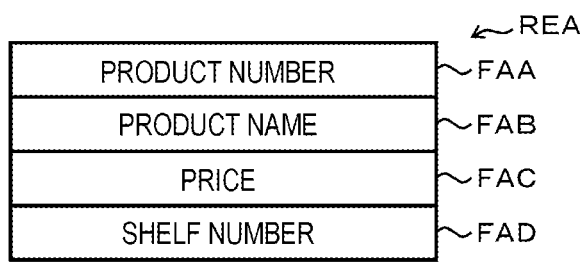
FIG. 3 is a schematic diagram illustrating a data structure of one data record included in a product database illustrated in FIG. 2.

A portion of the storage area of the auxiliary storage unit 13 is used as a product database DBA, a shelf database DBB, and a behavior database DBC. The product database DBA includes various data regarding products that may be sold in shops (hereinafter referred to as handling products). The shelf database DBB includes various data regarding display shelves installed in shops for displaying the handling products. The behavior database DBC integrates tracking data described below. FIG. 3 is a schematic diagram illustrating a data structure of one data record REA included in the product database DBA.

The product database DBA is a set of data records REAs individually associated with the handling products, for example. The data record REA includes fields FAA, FAB, FAC, and FAD. The field FAA is set with a product number as an identifier of the associated handling product. The field FAB is set with a product name which is the name given to the associated handling product. The field FAC is set with a price of the associated handling product. The field FAD is set with a shelf number as an identifier of a display shelf on which the associated handling product is displayed. In addition, the data record REA may include another field in which any other data is set.

Figure 4:
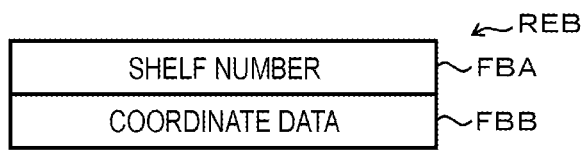
FIG. 4 is a schematic diagram illustrating a data structure of one data record included in a shelf database illustrated in FIG. 2.

FIG. 4 is a schematic diagram illustrating a data structure of one data record REB included in the shelf database DBB.

The shelf database DBB is a set of data records REBs individually associated with the display shelf, for example. The data record REB includes fields FBA and FBB. The field FBA is set with a shelf number as an identifier for the associated display shelf. The field FBB is set with coordinate data representing an installation position of the associated display shelf in the shop. Although the coordinate data may represent the coordinates related to any coordinate system, it is assumed that the coordinate data represents the coordinates related to the two-dimensional coordinate system determined for the sales floor of the shop, for example. The data record REB may include another field in which any other data is set.

Hereafter, the operation of the product sales processing system configured as described above will be described while focusing on the processes of the processor 11 in the shop server 1. The details of various processes described below are examples, and it is possible to change the order of some processes, omit some processes, add another process, and the like as appropriate. For example, in the following description, in order to explain the characteristic operation of the present embodiment in an easy-to-understand manner, the description of some processes is omitted. For example, if a certain error occurs, processes for dealing with the error may be performed, but description of some of such processes is omitted.

The service provided to the customer by the operation of the product sales processing system described below is called a smartphone POS service, a cart POS service, or the like, but will be referred to as the smartphone POS service below. Hereafter, an operation for tracking the customer in association with an operation for performing shopping with the user terminal 200 will be mainly described.

In order to use the smartphone POS service, the customer installs predetermined application software on his or her own smartphone or the like so as to use it as the user terminal 200. Alternatively, the customer borrows from the shop the user terminal 200 that is configured by installing predetermined application software on a tablet computer or the like. Then, before entering the shop, the customer boots up information processing based on the application software described above.

The customer carries the user terminal 200 and enters any shop provided with the shop system 100. At this time, the customer reads the check-in data represented by a two-dimensional code TCI with the user terminal 200 by capturing the two-dimensional code TCI with a camera of the user terminal 200. In response to this, the user terminal 200 performs a check-in process with the shop server 1 based on the check-in data so as to enable the smartphone POS service.

The customer moves around the shop and searches for products to buy. Then, the customer takes out the product to be purchased from the display shelf, and then inputs the product code of the product into the user terminal 200. For example, the customer reads a barcode displayed on the product, which represents the product code, with the camera provided in the user terminal 200. Alternatively, for example, the customer touches a button associated with the product code, which is displayed on a touch panel provided on the user terminal 200. Alternatively, for example, the customer operates the touch panel to manually input the product code. If the customer completes the registration of the purchased product and intends to pay the price of the purchased product, the customer performs a predetermined operation for instructing the payment on the touch panel. The customer performs other predetermined operations.

In the shop server 1, in response to the operation on the user terminal 200 by the customer as described above, the processor 11 executes the registration process for registering the product as a purchased product according to the virtual POS application APA. Any process may be used for this registration process, and the description thereof will be omitted. The registration process may be the same as the process for providing an existing smartphone POS service, for example.

If the check-in of the customer is completed, in parallel with the registration process for the customer, the processor 11 executes the tracking process for the same customer according to the tracking application APB. In a situation where a plurality of customers are checking in, the processor 11 respectively executes the registration process and the tracking process for each of the customers. Hereinafter, while being simply referred to as the "customer," this refers to the customer who is a target of the tracking process in the description.

Figure 5:
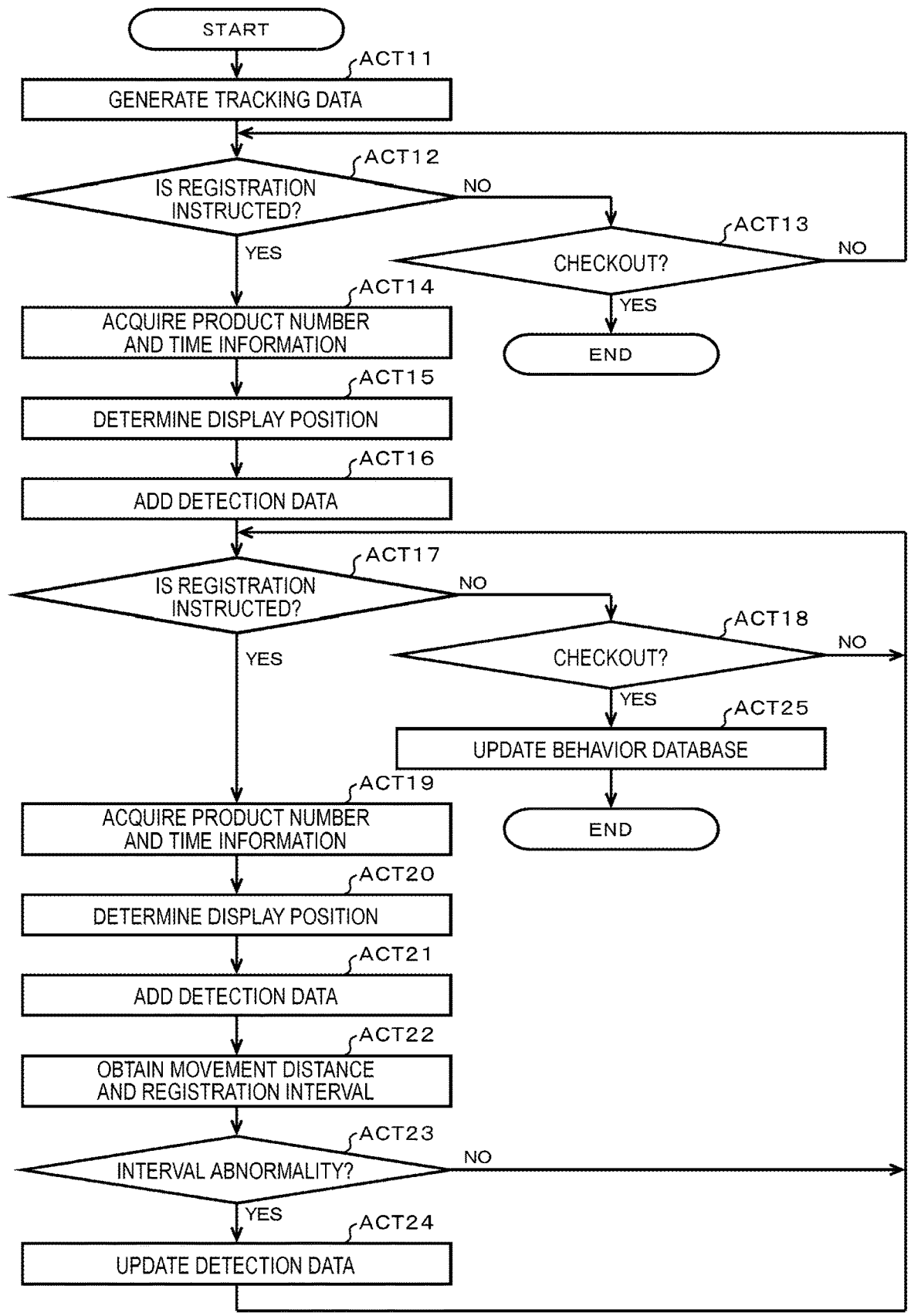
FIG. 5 is a flowchart illustrating a tracking process by a processor illustrated in FIG. 2.

FIG. 5 is a flowchart illustrating the tracking process by the processor 11.

In ACT 11, the processor 11 generates tracking data. The tracking data is data representing the tracking result of the customer from his or her one time of shopping at the shop.

Figure 6:
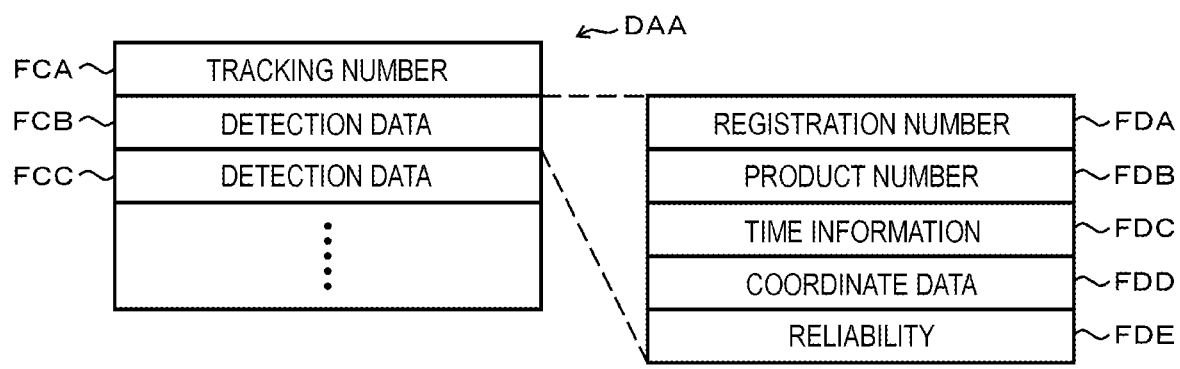
FIG. 6 is a schematic diagram illustrating a data structure of tracking data.

FIG. 6 is a schematic diagram illustrating a data structure of the tracking data.

The tracking data DAA includes a field FCA. The tracking data DAA may include one, or a plurality of fields FCB, FCC, and so on after the field FCA. How many fields the tracking data DAA includes after the field FCB varies according to the number of times the location of the associated customer is detected.

The processor 11 generates the tracking data DAA as data including only the field FCA. Then, the processor 11 determines a tracking number, which is different from the tracking number used in the tracking process executed in the past and the tracking process being executed in parallel, according to a predetermined rule, for example, and sets the tracking number in the field FCA.

In ACT 12 in FIG. 5, the processor 11 confirms whether or not the registration of the purchased product is instructed. Then, if the corresponding event cannot be confirmed, the processor 11 determines NO and proceeds to ACT 13.

In ACT 13, the processor 11 confirms whether or not the customer checked out. Then, if the corresponding event cannot be confirmed, the processor 11 determines NO and returns to ACT 12.

Thus, the processor 11 waits for the registration instruction or the checkout in ACT12 and ACT13.

If the customer does not purchase the product, the customer performs a predetermined operation for checkout on the user terminal 200. Then, if the registration process is completed in response to this, the processor 11 determines YES in ACT 13 and ends the tracking process.

If the customer performs the operation such as the one described above for instructing the registration of the purchased product and the notification data transmitted by the user terminal 200 for notification of this is received by the communication interface 15, the processor 11 determines YES in ACT 12, and proceeds to ACT 14.

In ACT 14, the processor 11 acquires the product number and the time information of the product instructed to be registered as the purchased product. For example, the processor 11 extracts, from the notification data described above, the product number related to the product to be registered as purchased. Further, the processor 11 acquires the time information output by the hardware clock 14, for example. If the notification data includes time information indicating the timing in which registration of a purchased product is instructed, the processor 11 may extract this time information from the notification data. Thus, if the processor 11 executes information processing based on the tracking application APB, the computer including the processor 11 as a central part serves as a timing determining unit.

In ACT 15, the processor 11 determines a display position of the purchased product. For example, the processor 11 finds from the product database DBA the data record REA in which the product number acquired in ACT 14 is set in the field FAA, and extracts the shelf number set in the field FAD of the corresponding data record REA. Then, the processor 11 finds from the shelf database DBB the data record REB in which the extracted shelf number is set in the field FBA, and acquires the coordinate data set in the field FBB of the corresponding data record REB. As a result, the processor 11 determines the display position as the position represented by the acquired coordinate data. Thus, if the processor 11 executes information processing based on the tracking application APB, the computer including the processor 11 as a central part serves as a position determining unit.

In ACT 16, the processor 11 adds new detection data to the tracking data DAA. The processor 11 adds a field in which the new detection data is set, after the field at the end of the current tracking data DAA, for example. The detection data includes fields FDA, FDB, FDC, FDD, and FDE as illustrated in FIG. 6. The processor 11 sets the field FDA with a registration number as an identifier for identifying each of the detection data included in one tracking data DAA. The processor 11 may use the registration number determined each time the purchased product is registered in the registration process as it is, or may determine the registration number independently of the registration process in accordance with a predetermined rule. The processor 11 sets the product number and the time information acquired by ACT 19 in the fields FDB and FDC. The processor 11 sets the display position determined by ACT 20, that is, the coordinate data extracted from the data record REB, for example, in the field FDD. The processor 11 sets a predetermined initial value as a reliability in the field FDE. As an example, the initial value is "high." In addition, the detection data may not include some fields such as the field FDB and the like, for example. Further, a field in which any other data is set may be added to the detection data.

The operation of the customer for registering a purchased product is typically performed immediately after the corresponding product is taken out of the display shelf. In this case, since the customer who performs the operation for registering a purchased product is located in the immediate vicinity of the display shelf on which the corresponding product is displayed, the error between the position of the corresponding display shelf and the position of the customer is small. Therefore, in the present embodiment, the position of the display shelf on which the product designated as the purchased product is displayed is detected as the position of the customer who performs the operation for registering the product as the purchased product. Then, in the present embodiment, the coordinate data representing the position of the display shelf is set in the field FDD of the detection data as the detection result of the position of the customer. Meanwhile, the customer is located in front of the display shelf and not at the same position as the position of the display shelf. Therefore, the processor 11 may set the coordinate data obtained by correcting the coordinate data acquired by ACT 20 in the field FDD, in consideration of the relationship between the position of the display shelf and the standard position of the customer if taking out the product from the display shelf. Alternatively, a database illustrating the corrected position as described above in association with the display shelf may be prepared, and the processor 11 may set the coordinate data acquired from this database in the field FDD.

However, the customer may perform the operation for registering the product as a purchased product after having carried the product around for some time. That is, the operation for registering the purchased product may be performed at a place away from the display shelf on which the corresponding product was displayed. In this case, the error between the position represented by the coordinate data set in the field FDD of the detection data as described above and the position of the customer is increased, and the reliability of the coordinate data representing the position of the customer decreases. However, since the reliability of the coordinate data set in the field FDD cannot be evaluated when the processor 11 executes ACT 16, in the present embodiment, the reliability set in the field FDE is provisionally written as "high."

In ACT 17, the processor 11 confirms whether or not the registration of the purchased product is instructed. Then, if the corresponding event cannot be confirmed, the processor 11 determines NO and proceeds to ACT 18.

In ACT 18, the processor 11 confirms whether or not the customer checked out. Then, if the corresponding event cannot be confirmed, the processor 11 determines NO and returns to ACT 17.

Thus, the processor 11 waits for the registration instruction or the checkout in ACT17 and ACT18.

If the customer performs the operation such as the one described above for instructing the registration of the second and subsequent purchased products and the notification data transmitted by the user terminal 200 for notification of this is received by the communication interface 15, the processor 11 determines YES in ACT 17, and proceeds to ACT 19.

In ACT 19, the processor 11 acquires the product number and the time information of the product instructed to be registered as the purchased product. The specific process of the processor 11 at this time may be the same as that of ACT 14, for example.

In ACT 20, the processor 11 determines the display position of the purchased product. The specific process of the processor 11 at this time may be the same as that of ACT 15, for example.

In ACT 21, the processor 11 adds new detection data to the tracking data DAA. The specific process of the processor 11 at this time may be the same as that of ACT 16, for example.

In ACT 22, the processor 11 obtains a movement distance and a time interval (hereinafter, referred to as registration interval) of the customer between these registration instructions, based on the detection result by the current registration instruction of the purchased product and the detection result by the immediately preceding registration instruction of the purchased product. For example, the processor 11 calculates a linear distance between coordinates represented by the coordinate data set in the field FDD of the detection data added to the tracking data DAA in the immediately preceding ACT 21, and coordinates represented by the coordinate data set in the field FDD of the detection data set in the field immediately before the end of the tracking data DAA, and uses this as the movement distance. Further, for example, the processor 11 calculates the registration interval as an absolute value of the difference between the time represented by the time information set in the field FDC of the detection data added to the tracking data DAA in the immediately preceding ACT 21 and the time represented by the time information set in the field FDC of the detection data set in the field immediately before the end of the tracking data DAA.

In addition, data representing a layout of passages that can be used by the customer for movement may be stored in the auxiliary storage unit 13, for example, and the processor 11 may refer to this data and calculate a distance of the shortest path between the two coordinates via the passages as the movement distance. Additionally, the processor 11 may calculate the movement distance according to an algorithm appropriately determined by the developer of the tracking application APB or the like, for example. That is, it is sufficient to calculate the movement distance as some index value regarding the movement distance of the customer between two consecutive registration instructions, and it is not necessary to calculate the actual movement distance of the customer.

In ACT 23, the processor 11 confirms whether or not it is an interval abnormality. The interval abnormality is an abnormality in which the registration interval obtained by ACT 22 is too short for the customer to move the movement distance obtained by ACT 22. For example, the processor 11 determines that it is an interval abnormality when a value S obtained by dividing the movement distance obtained by ACT 22 by the registration interval obtained by ACT 22 meets a predetermined determination condition. The determination condition may be freely determined by the developer of the tracking application APB, for example. As an example, it is assumed that the determination condition is "the value S is greater than a predetermined threshold value." Then, if it is the interval abnormality, the processor 11 determines YES in ACT 23 and proceeds to ACT 24.

In ACT 24, the processor 11 updates the detection data previously included in the tracking data DAA in order to change the reliability of the detection result by the immediately preceding registration instruction of the purchased product. For example, the processor 11 rewrites the reliability set in the field FDE of the detection data set in the field immediately before the field of the end of the tracking data DAA from "high" to "low." Then after this, the processor 11 returns to the standby state of ACT 17 and ACT 18. If the processor 11 determines NO in ACT 23 because it is not the interval abnormality, the processor 11 returns to the standby state of ACT 17 and ACT 18 without executing ACT 24. Thus, if the processor 11 executes information processing based on the tracking application APB, the computer including the processor 11 as a central part serves as a reliability determining unit. As described above, the customer basically performs, on the spot, the operation for registering the product taken out from the display shelf as a purchased product. However, the customer may move to another place, carrying the product with him or her, and then perform the operation for registering that product carried by the customer but not yet registered as the purchased product, as he or she decides to purchase another product. Then, in this case, the customer performs the operation for registering the other product as the purchased product within a short period of time. Therefore, in the present embodiment, the above is regarded as the case of the interval abnormality, and the processor 11 sets the reliability of the detection result by the immediately preceding registration instruction of the purchased product to be "low," and if it is not the interval abnormality, the processor 11 determines the reliability to be "high." Thus, if the processor 11 executes information processing based on the tracking application APB, the computer including the processor 11 as a central part serves as a generating unit.

If the customer registers all of the products to be purchased as the purchased products, the customer performs the operation for payment of the price of the purchased products on the user terminal 200. In response to this, in the registration process, the processor 11 executes the payment process for the payment described above, and ends the registration process if the payment process is normally completed. In response to this, the processor 11 determines YES in ACT 18, and proceeds to ACT 25.

In ACT 25, the processor 11 updates the behavior database DBC to reflect the result of the tracking by the current tracking process. For example, the processor 11 updates the behavior database DBC to include the tracking data DAA in its last updated state in the current tracking process. That is, if the processor 11 moves from ACT 16 to the standby state of ACT 17 and ACT 18, the processor 11 includes the tracking data DAA after the addition of the detection data by ACT 16 in the behavior database DBC. Further, if the processor 11 moves from ACT 24 to the standby state of ACT 17 and ACT 18, the processor 11 includes the tracking data DAA after the update of the detection data by ACT 24 in the behavior database DBC. Further, for example, if the processor 11 moves from ACT 23 to the standby state of ACT 17 and ACT 18, the processor 11 includes the tracking data DAA after the addition of the detection data by ACT 21 in the behavior database DBC. Then, after this, the processor 11 ends the tracking process. Thus, if the processor 11 executes information processing based on the tracking application APB, the computer including the processor 11 as a central part serves as an integrating unit.

Thus, the behavior database DBC is the one that is obtained by accumulating the tracking data DAA obtained respectively by the tracking processes different from each other. The processor 11 may include data obtained by omitting some data such as the registration number, the product number, or the like from the tracking data DAA, in the behavior database DBC. Alternatively, the processor 11 may add, to the behavior database DBC, data obtained by adding some predetermined data to the tracking data DAA.

As described above, the shop server 1 determines that the display position of the product designated to be registered as the purchased product is the registration position where the corresponding product is designated, on the premise that the product to be registered as the purchased product is designated at the display position of the product. The shop server 1 determines the reliability of the immediately preceding registration position, based on the timing when the above designation is made for the product displayed at the display position determined as the registration position and the corresponding registration position as described above, and the timing when the above designation is made for the product displayed at the display position determined as the immediately preceding registration position and the corresponding registration position. Then, the shop server 1 generates the tracking data by associating the reliability determined as described above with the immediately preceding registration position and the timing when the above designation is made for the product displayed at the display position determined as the immediately preceding registration position.

Thus, according to the shop server 1, from the tracking data, it is possible to analyze the pattern of movement of customers as a change-over-time in the registration position. The shop server 1 may be easily realized without using a sensor or the like to perform certain detection operations regarding the movement of the customer when generating the tracking data. Then, from the tracking data, it is possible to recognize, based on the reliability, the certainty of the registration position that is changing, according to a matching degree with the premise for the situation the product is designated, and it is possible to analyze the behavior of customers using this. For example, if the reliability of the registration position determined for a certain product is frequently low, since it can be seen that the designation of the product is frequently performed at a place other than the display position, it can be seen that there is a concern that the display position may not be appropriate. This embodiment may be modified in various ways as follows.

The processor 11 may determine the determined registration position as any of three or more levels of reliability. For example, if the value S described above is equal to or greater than a predetermined first threshold value, the processor 11 may set the reliability to be "low," if the value S is less than the first threshold value and equal to or greater than a second threshold value smaller than the first threshold value, the processor 11 may set the reliability to be "medium," and further, if the value S is less than the second threshold value, the processor 11 may set the reliability to be "high."

The reliability may be determined by another method such as table reference and the like. For example, a data table representing the reliability may be prepared in association with a combination of two display shelves, and the processor 11 may acquire from the data table described above the reliability associated with the combination of one display shelf that displays the products for which registration is newly designated and the other display shelf that displays the products for which registration is designated immediately previously.

The change or determination of the reliability may be executed as post-processing. That is, for example, if the processor 11 ends ACT 21 of FIG. 5, the processor 11 may return to the standby state of ACT 17 and ACT 18, and may execute the processes of ACT 22 through ACT 24 with respect to the detection data with respect to the tracking data included in the behavior database DBC. In this case, by executing the change or determination of the reliability at a timing when the processing load of the shop server 1 is small, such as, for example, outside of business hours of the shop and the like, the processing load of the shop server 1 can be distributed.

The initial value of reliability may be "low." Then, in this case, for example, instead of executing ACT 24 in FIG. 5, if the processor 11 determines NO in ACT 23, the processor 11 updates the detection data to rewrite the reliability of the detection result by the immediately preceding registration instruction of the purchased product from "low" to "high."

The initial value of the reliability may be any value other than "high" and "low," such as a Null value and the like, for example. Then, in this case, if it can be determined that the reliability is different from the initial value, the processor updates the detection data to indicate the corresponding reliability.

In the embodiment described above, the reliability of the registration position determined for the last product instructed to be registered before checkout is not subject to the processing after ACT19. Therefore, if the predetermined value as the reliability of the registration position is different from the initial value, and if the processor 11 determines YES in ACT 18, the processor 11 rewrites the reliability set in the field FDE of the detection data set in the field at the end of the current tracking data DAA to the predetermined value described above. The shop server 1 may be replaced with another server device provided in any facility other than the shop.

When implementing shopping using the cart terminal 300 instead of the user terminal 200, the cart terminal 300 may perform reading instead of the user terminal 200 in the description described above. Meanwhile, in the case of the cart terminal 300, for example, at least some of the various data indicated in the check-in data may be stored in the storage device in the cart terminal 300 in advance such that the reading of the check-in data may be omitted.

If the user terminal 200 is lent to the customer at the shop, at least some of the various data indicated in the check-in data may be stored in the storage device in advance such that the reading of the check-in data may be omitted.

The process of the shop server 1 may be performed by several server devices in a distributed manner.

Exchange of various data between the shop server 1 and the user terminal 200 and the cart terminal 300 may be performed by another server device in a relay manner.

Each function realized by the processor 11 by information processing can also be partially or completely realized by hardware that executes information processing that is not based on a program, such as a logic circuit or the like. Further, each of the functions described above can be realized by combining software control with the hardware described above such as a logic circuit or the like.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An information processing device comprising a processor configured to:
    determine a first timing designated for a product registered as a purchased product;
    determine a first registration position where the product is designated;
    determine a second timing designated for the product;
    determine a second registration position where the product is designated;
    determine, based on the first timing, the first registration position, the second timing, and the second registration position, a first reliability of the first registration position; and
    generate first tracking data relating to the product by associating the second timing, the second registration position, and the first reliability.

2. The information processing device of claim 1, wherein the processor is further configured to:
    determine the first reliability based on an elapsed time from the first timing to the second timing; and
    determine a distance from the first registration position to the second registration position.

3. The information processing device of claim 2, wherein the processor is further configured to determine the first reliability to be low when the elapsed time is abnormally short for a customer to move the distance.

4. The information processing device of claim 2, wherein the processor is further configured to:
    determine a value by dividing the distance by the elapsed time;
    compare the value to a threshold; and
    determine the first reliability to be low when the value is greater than or equal to the threshold.

5. The information processing device of claim 4, wherein the processor is further configured to determine the first reliability to be high when the value is less than the threshold.

6. The information processing device of claim 1, wherein:
    the first timing is designated by a first customer; and
    the processor is further configured to:
        determine a third timing designated for the product by a second customer,
        determine a third registration position where the product is designated,
        determine a fourth timing for the product;
        determine a fourth registration position where the product is designated,
        determine, based on the third timing, the third registration position, the fourth timing, and the fourth registration position, a second reliability of the third registration position,
        generate second tracking data relating to the product by associating the fourth timing, the fourth registration position, and the second reliability, and
        integrate the first tracking data and the second tracking data.

7. The information processing device of claim 1, wherein the second registration position is a display position of the product.

8. The information processing device of claim 1, further comprising a camera communicable with the processor;
    wherein the processor is further configured to:
        read a code to determine check-in data before the first timing is determined, and
        initiate a check-in process with a shop server based on the check-in data.

9. The information processing device of claim 1, further comprising a camera communicable with the processor and configured to obtain an image of a code;
    wherein the processor is further configured to:
        read the code from the image, and
        determine the first registration position after obtaining the image of the code.

10. The information processing device of claim 1, further comprising a touch panel configured to display a button associated with an input, the touch panel communicable with the processor;
    wherein the processor is configured to:
        obtain the input from the touch panel, and
        determine the first registration position after obtaining the input.

11. A method of using an information processing device, the method comprising:
    determining, by the information processing device, a first timing designated for a product registered as a purchased product;
    determining, by the information processing device, a first registration position where the product is designated;
    determining, by the information processing device, a second timing designated for the product;
    determining, by the information processing device, a second registration position where the product is designated;
    determining, by the information processing device, a first reliability of the first registration position based on the first timing, the first registration position, the second timing, and the second registration position; and
    generating, by the information processing device, first tracking data relating to the product by associating the second timing, the second registration position, and the first reliability.

12. The method of claim 11, further comprising determining, by the information processing device, an elapsed time from the first timing to the second timing;

wherein the information processing device is configured to determine the first reliability based on the elapsed time.

13. The method of claim 12, further comprising:
determining, by the information processing device, a distance from the first registration position to the second registration position;
determining, by the information processing device, a value by dividing the distance by the elapsed time;
comparing, by the information processing device, the value to a threshold;
determining, by the information processing device, the first reliability to be low when the value is greater than or equal to the threshold; and
determining, by the information processing device, the first reliability to be high when the value is less than the threshold.

14. The method of claim 11, further comprising:
determining, by the information processing device, a third timing designated for the product by a second customer;
determining, by the information processing device, a third registration position where the product is designated;
determining, by the information processing device, a fourth timing for the product;
determining, by the information processing device, a fourth registration position where the product is designated;
determining, by the information processing device, based on the third timing, the third registration position, the fourth timing, and the fourth registration position, a second reliability of the third registration position;
generating, by the information processing device, second tracking data relating to the product by associating the fourth timing, the fourth registration position, and the second reliability; and
integrating, by the information processing device, the first tracking data and the second tracking data.

15. The method of claim 11, further comprising:
reading, by the information processing device, a code to determine check-in data before the first timing is determined; and
performing, by the information processing device, a check-in process based on the check-in data.

16. The method of claim 11, further comprising:
reading, by the information processing device, a code; and
determining, by the information processing device, the first registration position after reading the code.

17. A system comprising:
a first terminal associated with a first customer;
a second terminal associated with a second customer; and
a shop server associated with a shop and in wireless communication with the first terminal and the second terminal, the shop server comprising a processor configured to:
    receive a first communication from the first terminal associated with registration of a product located in the shop,
    determine a first timing for the product after receiving the first communication,
    determine a first registration position associated with the product after receiving the first communication,
    receive a second communication from the second terminal associated with registration of the product,
    determine a second timing for the product after determining the first timing and the first registration position and receiving the second communication,
    determine a second registration position associated with the product after determining the first timing and the first registration position and receiving the second communication,
    determine a reliability of the first registration position based on the first timing, the first registration position, the second timing, and the second registration position, and
    generate tracking data associated with the product by associating the second timing, the second registration position, and the reliability.

18. The system of claim 17, wherein:
the second terminal comprises a camera configured to obtain an image of a code; and
the processor is further configured to:
    receive a third communication from the second terminal, the third communication associated with the code, and
    communicate with the second terminal to initiate check-in of the second customer after receiving the third communication.

19. The system of claim 17, wherein:
the second terminal comprises a camera configured to obtain an image of a code; and
the processor is further configured to:
    receive a third communication from the second terminal, the third communication associated with the code, and
    determine the second registration position after receiving the third communication.

20. The system of claim 17, wherein:
the second terminal comprises a camera configured to:
    obtain a first image of a first code, and
    obtain a second image of a second code; and
the processor is further configured to:
    receive a third communication from the second terminal, the third communication associated with the first code,
    communicate with the second terminal to initiate check-in of the second customer after receiving the third communication,
    receive a fourth communication from the second terminal, the fourth communication associated with the second code, and
    determine the second registration position after receiving the third communication.

* * * * *